(12) United States Patent  
Parikh et al.

(10) Patent No.: US 6,361,239 B1
(45) Date of Patent: Mar. 26, 2002

(54) BOLT WITH EXPANDABLE BUSHING FOR PIVOT ATTACHMENT

(75) Inventors: Samir Parikh, Troy; Susan M. Lipski, Sterling Heights, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/458,744

(22) Filed: Dec. 10, 1999

(51) Int. Cl.[7] .................................................. B25G 3/28
(52) U.S. Cl. ........................ 403/282; 411/383; 411/544; 411/914; 411/903; 297/15
(58) Field of Search ................................. 403/158, 161, 403/154, 155, 151, 150, 224, 225, 282; 411/383, 542, 544, 914, 903, 546; 297/15

(56) References Cited

U.S. PATENT DOCUMENTS

| 1,467,824 A | | 9/1923 | Ahlers |
| 2,303,673 A | | 12/1942 | Wilson |
| 3,136,203 A | | 6/1964 | Davis |
| 3,271,058 A | | 9/1966 | Anderson |
| 3,290,982 A | | 12/1966 | Marschner |
| 3,464,306 A | | 9/1969 | Reynolds et al. |
| 3,888,156 A | * | 6/1975 | Fima |
| 3,933,331 A | | 1/1976 | Blom |
| RE30,445 E | | 12/1980 | Ruhl |
| 4,330,230 A | * | 5/1982 | Giannuzzi |
| 4,437,805 A | | 3/1984 | Smith |
| 4,662,597 A | | 5/1987 | Uecker et al. |
| 4,720,224 A | * | 1/1988 | Peterken |
| 4,807,935 A | * | 2/1989 | King |
| 4,884,916 A | * | 12/1989 | Johnson |
| 4,921,384 A | * | 5/1990 | Nordyke |
| 5,018,920 A | | 5/1991 | Speakman |
| 5,769,499 A | * | 6/1998 | Dudash et al. |
| 6,004,085 A | * | 12/1999 | Yamamoto et al. |

OTHER PUBLICATIONS

Prior Art, FIg. 1.*

* cited by examiner

*Primary Examiner*—Lynne H. Browne
*Assistant Examiner*—Tomlyne A Malcolm
(74) *Attorney, Agent, or Firm*—Brooks & Kushman P.C.

(57) ABSTRACT

A pivot assembly is provided for pivotally attaching a pivotable seat component to a fixed seat component. The fixed component includes first and second apertures, first and second outer surfaces and first and second inner surfaces adjacent the apertures, and the pivotable component includes at least one pivot hole therein. The pivot assembly includes a bolt having a head, a cylindrical portion and a threaded portion. A threaded nut is engageable with the threaded portion of the bolt. A generally cylindrical plastic bushing is fitted over the cylindrical portion of the bolt and includes a peripheral lip abutting the head of the bolt and a plurality of swageable flanges extending at least partially over the threaded portion of the bolt. The swageable flanges cooperate to form a generally cylindrical shape having an outside diameter which is smaller than the first aperture and the pivot hole for insertion therethrough and larger than the second aperture for swaging against the second inner surface as the nut and bolt are threadedly engaged.

20 Claims, 3 Drawing Sheets

BOLT WITH EXPANDABLE BUSHING FOR PIVOT ATTACHMENT

TECHNICAL FIELD

The present invention relates to a bolt with a swageable/expandable plastic bushing for pivotally attaching a fixed seat component to a pivoting seat component in a manner in which metal-to-metal contact is eliminated while using only a single bushing.

BACKGROUND ART

It is often desirable to provide plastic bushings between relatively movable steel parts for avoiding metal-to-metal contact of the steel parts, especially in applications where squeak and rattle issues are important. By providing plastic bushings between fixed and pivoting vehicle seat components in a collapsible seat assembly, squeak and rattle between the fixed and pivoting steel components can be prevented.

A prior art example of relatively movable steel components is shown in FIG. 1. FIG. 1 schematically illustrates a portion of a seat assembly 10, wherein a fixed seat component 12 has a pivoting seat component 14 pivotally attached thereto. A bolt, not shown, extends through apertures 16, 18, 20, 22 in the fixed and pivoting seat components 12,14. Three plastic bushings 24, 26, 28 are provided in the apertures 16, 18, 20 to prevent metal-to-metal contact between the bolt, the fixed component 12, and the pivoting component 14. The bolt is screwed into the nut 30, which is welded to the fixed component 12 to complete the assembly.

The above-described prior art design is problematic because the bushings 24, 26, 28 must be installed by hand, which is somewhat difficult and time-consuming. Also, these bushings have a tendency to fall out which may result in squeak and rattle problems. Also, an installer may inadvertently fail to install one or more of the three bushings, which leads to quality problems.

Accordingly, it is desirable to provide an improved pivot assembly for pivotally attaching a pivoting metal component to a fixed metal component in a manner in which squeak and rattle issues are eliminated, part count is reduced, and installation is simplified.

DISCLOSURE OF INVENTION

The present invention overcomes the above-referenced shortcomings of the prior art pivot assembly shown in FIG. 1 by replacing the three bushings with a single bushing attached to a bolt (or screw) and having an end which flares out during installation. The single plastic bushing prevents metal-to-metal contact between the fixed and pivoting component to avoid squeak and rattle issues. This design ensures proper installation, and is also easier to install.

More specifically, the present invention provides a pivot assembly for pivotally attaching a pivotable seat component to a fixed seat component, wherein the fixed component includes first and second apertures, first and second outer surfaces and first and second inner surfaces adjacent the apertures. The pivotable component includes at least one pivot hole therein. The pivot assembly includes a bolt having a head, a cylindrical portion and a threaded portion. A threaded nut is engageable with the threaded portion of the bolt. A generally cylindrical plastic bushing is fitted over the cylindrical portion of the bolt and includes a peripheral lip abutting the head of the bolt. A plurality of swageable flanges extend at least partially over the threaded portion of the bolt. The swageable flanges cooperate to form a generally cylindrical shape having an outside diameter which is smaller than the first aperture and the pivot hole for insertion therethrough, and larger than the second aperture for swaging against the second inner surface as the nut and bolt are threadedly engaged, thereby eliminating the need for three separate bushings at the pivot hole and at the first and second apertures for preventing metal-to-metal contact between the fixed and pivoting components, and between the bolt and pivoting component.

This bolt and bushing assembly is useful not only in vehicle seat assemblies, but in any assembly including pivotally attached steel components wherein avoidance of squeak and rattle is important and ease of assembly is important.

Accordingly, an object of the invention is to provide an improved pivot assembly for pivotally attaching steel components in a manner in which squeak and rattle are reduced or eliminated, proper installation is ensured, and installation is simplified.

A further object of the invention is to provide an improved pivot assembly for pivotally attaching fixed and pivotable seat components in a manner in which part count is reduced.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 3:
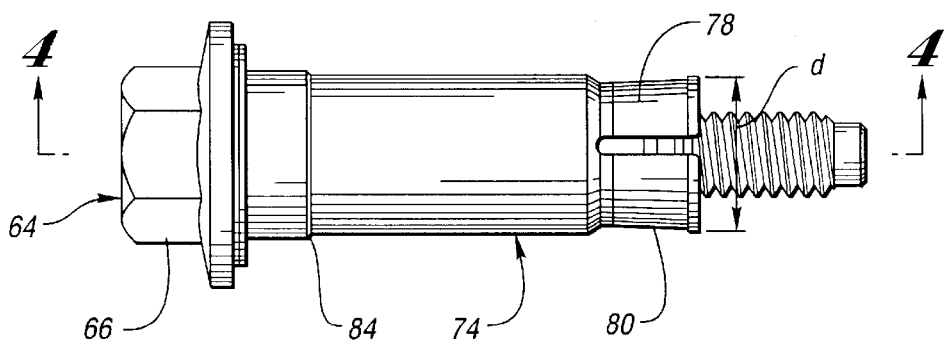
FIG. 3 shows a side view of the bolt and bushing of FIG. 2.
Figure 4:
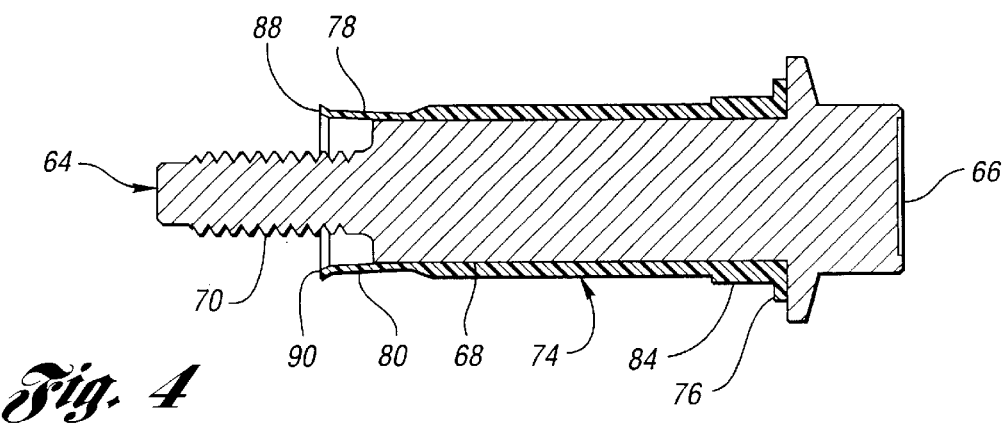
FIG. 4 shows a longitudinal cross-sectional view of the bolt and bushing of FIG. 2.
Figure 5:
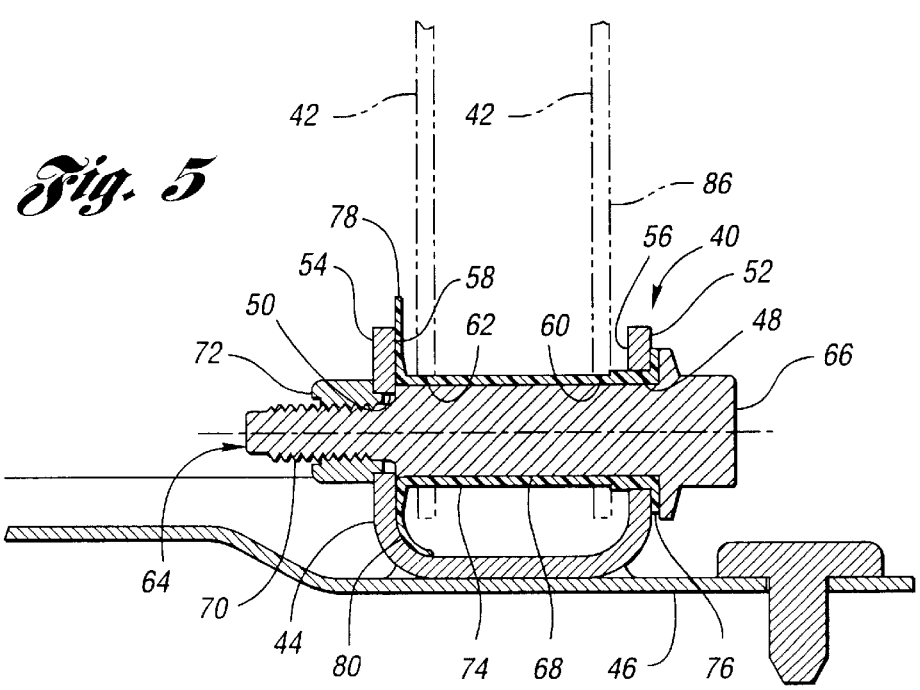
FIG. 5 shows a vertical cross-sectional view of the bolt and bushing of FIG. 2 installed between fixed and pivoting seat components.

Referring to FIGS. 2–5, and specifically to FIG. 5, a preferred embodiment of a pivot assembly 40 is shown for pivotally attaching a pivotable steel seat component 42 to a fixed steel seat component 44 in a vehicle. The fixed seat component 44 is fixed to the floor of a vehicle by a frame component 46, which is otherwise attached to the floor. The pivotable seat component 42 is used for pivotally attaching a collapsible seat in a vehicle. For example, an upper end of the pivotable seat component 42 shown in FIG. 5 may be attached to a forward edge of a lower seat so that the seat may be pivotably collapsed forward in the vehicle. Of course, this environment is only an exemplary use of the invention, which may be used in a variety of different applications wherein metal components are pivotally attached.

As shown in FIG. 5, the fixed component 44 includes first and second apertures 48,50, first and second outer surfaces 52,54, and first and second inner surfaces 56,58 adjacent the apertures 48,50. A pivotable component 42 includes first and second pivot holes 60,62 formed therein.

The pivot assembly 40 includes a bolt 64 having a head 66, a cylindrical portion 68 and a threaded portion 70. A threaded nut 72 is welded to the fixed component 44 for engagement with the threaded portion 70 of the bolt 64.

Figure 1:
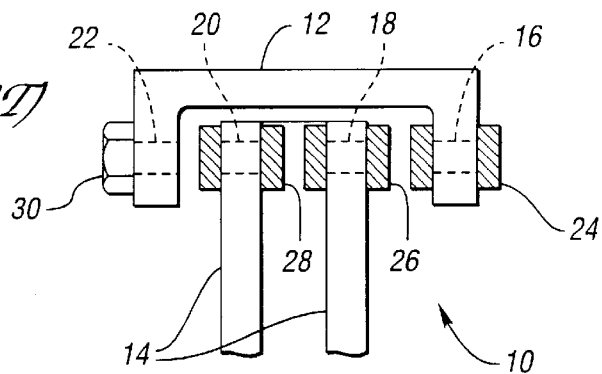
FIG. 1 shows a schematic side view of a prior art pivot assembly.
Figure 2:
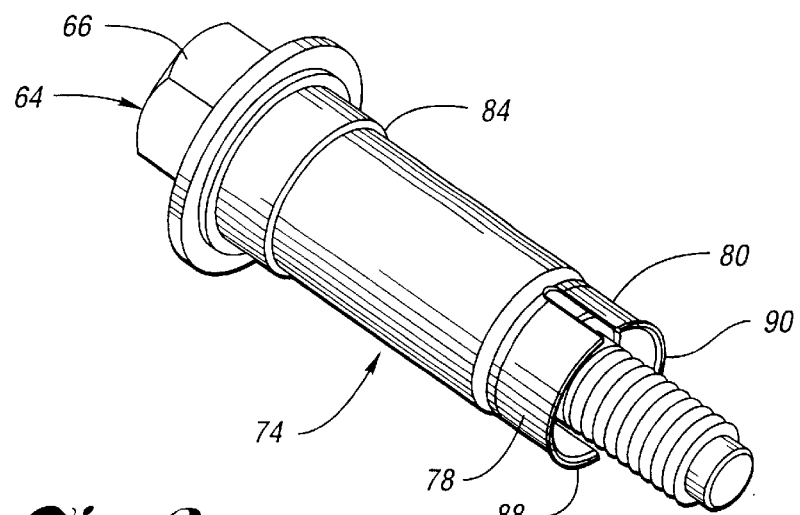
FIG. 2 shows a perspective view of a bolt and bushing in accordance with the present invention.

As most clearly shown in FIGS. 2–4, a generally cylindrical plastic bushing 74 is fitted over the cylindrical portion 68 of the bolt 64 and includes a peripheral lip 76 abutting the head 66 of the bolt 64. Swageable flanges 78,80 extend at least partially over the threaded portion 70 of the bolt 64. Preferably, the plastic bushing 74 is polypropylene, but various other materials could be used.

The swageable flanges 78,80 cooperate to form a generally cylindrical shape having an outside diameter (d) which is smaller than the first aperture 48 and the pivot holes 60,62 for insertion therethrough, and larger than the second aperture 50 for swaging against the second inner surface 58 as the nut 72 and bolt 66 are threadedly engaged, thereby eliminating the need for three separate bushings at the pivot holes 60,62 and the first aperture 48 for preventing metal-to-metal contact between the fixed and pivoting components and between the bolt 64 and the pivoting component 42.

In the assembled position shown in FIGS. 4 and 5, the peripheral lip 76 is positioned between the head 66 of the bolt 64 and the first outer surface 52 of the fixed component 44. The bushing 74 also includes a peripheral step 84 which abuts the third outer surface 86 of the pivotable component 42 adjacent the pivot hole 60.

As shown in FIGS. 4 and 5, the first aperture 48 and the first and second pivot holes 60,62 are bigger than the second aperture 50. The pivot assembly 40, including the bolt 64 and bushing 74, may be inserted through the first aperture 48 and the first and second pivot holes 60,62. Because the second aperture 50 is smaller than the outside diameter (d) of the generally cylindrical shape formed by the swageable flanges 78,80, the distal ends 88,90 of the swageable flanges 78,80 abut against the second inner surface 58, and thereafter flare out or expand radially as the threaded portion 70 of the bolt 64 is threadedly engaged into the nut 72.

As shown in FIGS. 2, 3 and 4, the distal ends 88,90 of the swageable flanges 78,80 are angled away from the bolt 64 to facilitate such flaring or swaging of the flanges 78,80 as the distal ends 88,90 contact the second inner surface 58. Although FIG. 5 shows a gap between the pivotable component 42 and the flanges 78,80, this gap may be eliminated by tolerance stack-up of the various components, in which case the flanges 78,80 will prevent contact between the pivotable component 42 and the second inner surface 58 to prevent squeak and rattle.

Figure 7:
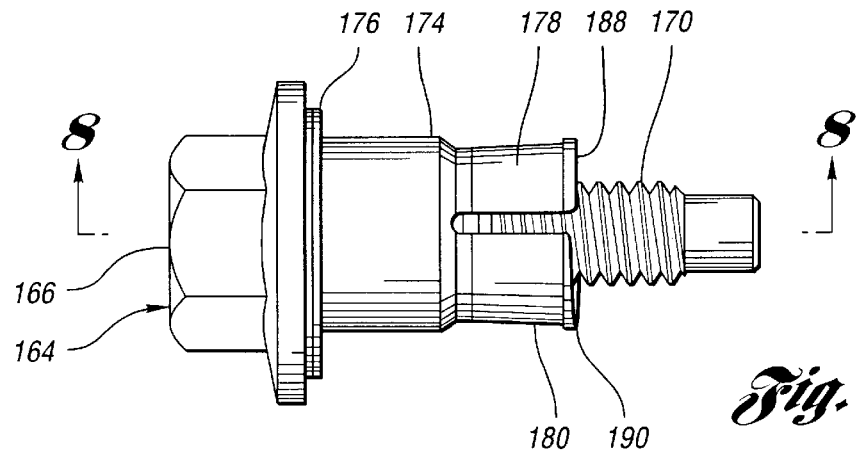
FIG. 7 shows a side view of the bolt and bushing of FIG. 6.
Figure 8:
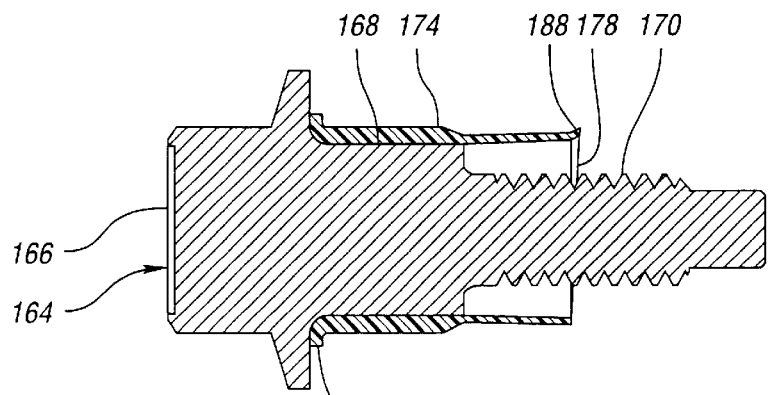
FIG. 8 shows a longitudinal cross-sectional view of the bolt and bushing of FIG. 6.
Figure 9:
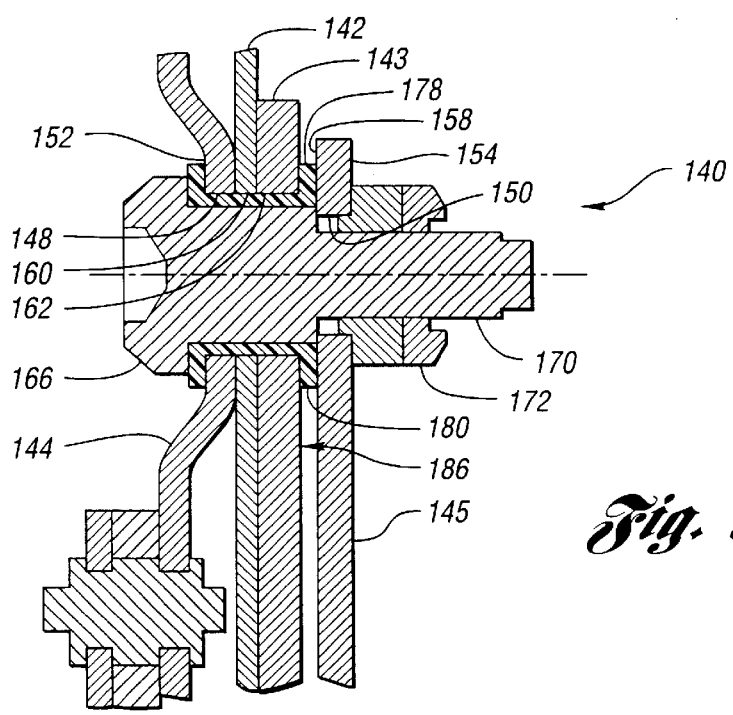
FIG. 9 shows a vertical cross-sectional view of the bolt and bushing of FIG. 6 installed between fixed and pivoting seat components.

Turning to FIGS. 6–9, an alternative embodiment of the invention is shown. In this embodiment, the pivot assembly 140 is used to pivotally attach a seat back to a lower seat cushion. As shown in FIG. 9, pivotable seat back frame components 142,143, which are welded together and pivotally screwed to latch 144, are pivotally attached to the fixed lower seat frame component 145 by the pivot assembly 140. As shown in FIG. 9, the fixed component 145 includes a first aperture 150, first outer surface 154, and first inner surface 158. The pivotable seat back frame components 142,143, 144 include first, second and third pivot holes 148,160,162, as well as first outer surface 152 and side surface 186.

The bolt 164 includes a head 166, a cylindrical portion 168, and a threaded portion 170. A nut 172 is welded to the fixed component 145 for threaded engagement with the threaded portion 170 of the bolt 164.

A plastic bushing 174 is fitted over the cylindrical portion 168 of the bolt 164, and includes a peripheral lip 176, which is positioned between the head 166 and the first outer surface 152 in the final assembly.

Swageable flanges 178,180 form a generally cylindrical shape, and are swaged against the second inner surface 158 as the bolt 164 is screwed into the nut 172.

Figure 6:
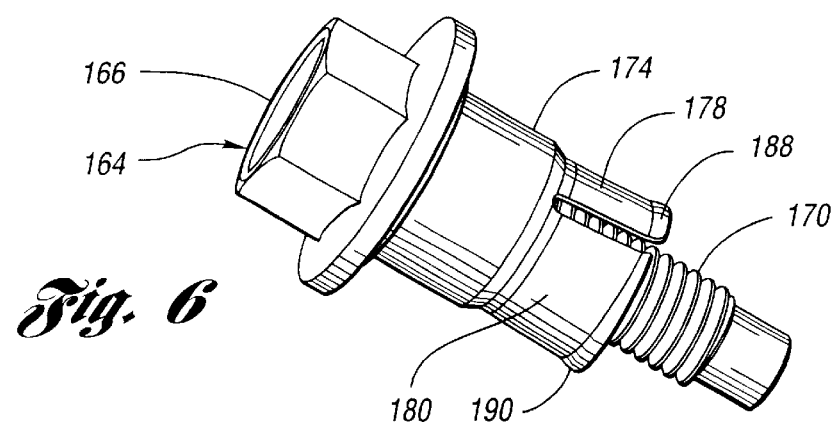
FIG. 6 shows a perspective view of a bolt and bushing in accordance with an alternative embodiment of the invention.

In the final assembly position, the flanges 178,180 extend radially after the swaging for engagement between the second inner surface 158 and the side surface 186, as shown in FIG. 9. Accordingly, metal-to-metal contact is prevented between the fixed component 145 and the pivoting components 142,143,144. Also, as shown in FIGS. 6–8, distal ends 188,190 of the swageable portions 178,180 are angled outward away from the bolt 164 to facilitate such swaging or flaring of the flanges 178,180.

While the best modes for carrying out the invention have been described in detail, those familiar with the art to which this invention relates will recognize various alternative designs and embodiments for practicing the invention within the scope of the appended claims.

What is claimed is:

1. In combination, a pivot assembly for pivotally attaching a pivotable seat component to a fixed seat component, wherein the fixed component includes first and second apertures, first and second outer surfaces and first and second inner surfaces adjacent the apertures, and the pivotable component includes at least one pivot hole therein, the pivot assembly comprising:

a bolt having a head, a cylindrical portion and a threaded portion;

a threaded nut engageable with the threaded portion of the bolt;

a generally cylindrical plastic bushing fitted over the cylindrical portion of the bolt and including a peripheral lip abutting the head of the bolt and a plurality of swageable flanges extending at least partially over the threaded portion of the bolt, said plurality of swageable flanges cooperating to form a generally cylindrical shape having an outside diameter which is smaller than the first aperture and the pivot hole for insertion therethrough and larger than the second aperture for swaging against the second inner surface as the nut and bolt are threadedly engaged, thereby eliminating the need for three separate bushings at the pivot hole and the first and second apertures for preventing metal-to-metal contact between the fixed and pivoting components, and between the bolt and pivoting component; and wherein said swageable flanges are configured to extend radially after said swaging to a position perpendicular to a central axis of the bolt for engagement with the second inner surface and with a side surface of the pivotable component adjacent the pivot hole.

2. The pivot assembly of claim 1, wherein the peripheral lip abuts the first outer surface when the bolt is threaded into the nut.

3. The pivot assembly of claim 2, wherein the pivotable component includes a third outer surface adjacent the pivot hole and the bushing includes a peripheral step abuttable against said third outer surface.

4. The pivot assembly of claim 1, wherein the first aperture is bigger than the second aperture.

5. The pivot assembly of claim 1, wherein each said swageable flange includes a distal end which is angled away from the bolt for engagement against the second inner surface to facilitate said swaging.

6. The pivot assembly of claim 1, wherein the nut is welded to the fixed component adjacent the second aperture.

7. The pivot assembly of claim 1, wherein the pivotable component includes first and second pivot holes.

8. In combination, a pivot assembly for pivotally attaching a pivotable metal component to a fixed metal component, wherein the fixed component includes first and second apertures, first and second outer surfaces and first and second inner surfaces adjacent the apertures, and the pivotable component includes at least one pivot hole therein, the pivot assembly comprising:

a bolt having a head, a cylindrical portion and a threaded portion;

a threaded nut engageable with the threaded portion of the bolt;

a generally cylindrical plastic bushing fitted over the cylindrical portion of the bolt and including a peripheral lip abutting the head of the bolt and a plurality of expandable flanges extending away from the head of the bolt, said plurality of expandable flanges cooperating to form a generally cylindrical shape having an outside diameter which is smaller than the first aperture and the pivot hole for insertion therethrough and larger than the second aperture for expanding against the second inner surface as the nut and bolt are threadedly engaged; and wherein each said expandable flange includes a distal end which is angled away from the bolt for engagement against the second inner surface to facilitate said expanding.

9. The pivot assembly of claim 8, wherein the peripheral lip abuts the first outer surface when the bolt is threaded into the nut.

10. The pivot assembly of claim 9, wherein the pivotable component includes a third outer surface adjacent the pivot hole and the bushing includes a peripheral step abuttable against said third outer surface.

11. The pivot assembly of claim 8, wherein the first aperture is bigger than the second aperture.

12. The pivot assembly of claim 8, wherein the nut is welded to the fixed component adjacent the second aperture.

13. The pivot assembly of claim 8, wherein the pivotable component includes first and second pivot holes.

14. The pivot assembly of claim 8, wherein said expandable flanges are configured to extend radially after said expanding for engagement with the second inner surface and with a side surface of the pivotable component adjacent the pivot hole.

15. A pivoting seat assembly comprising:

a fixed seat component (145) including a first aperture (150), first outer surface (154) and a first inner surface (158) adjacent the aperture (150);

a pivotable seat component (142,143,144) including at least one pivot hole (148,160,162) therein;

a bolt (166) having a head, a cylindrical portion and a threaded portion;

a threaded nut (172) engageable with the threaded portion of the bolt to secure the bolt in the first aperture and in the pivot hole to pivotally attach the pivotable component to the fixed component;

a generally cylindrical plastic bushing (174) fitted over the cylindrical portion of the bolt and including a peripheral lip abutting the head of the bolt and a plurality of swageable flanges extending at least partially over the threaded portion of the bolt, said plurality of flanges cooperating to form a generally cylindrical shape having an outside diameter which is smaller than the pivot hole for insertion therethrough and larger than the first aperture for swaging against the first inner surface as the nut and bolt are threadedly engaged, thereby preventing metal-to-metal contact when the pivotable component is pivotally attached to the fixed component; and wherein said swageable flanges are configured to extend radially after said swaging to a position perpendicular to a central axis of the bolt for engagement with the first inner surface and with a side surface of the pivotable component adjacent the pivot hole.

16. The seat assembly of claim 15, wherein the peripheral lip abuts the first outer surface when the bolt is threaded into the nut.

17. The seat assembly of claim 15, wherein each said swageable flange includes a distal end which is angled away from the bolt for engagement against the first inner surface to facilitate said swaging.

18. The seat assembly of claim 15, wherein the nut is welded to the fixed component adjacent the first aperture.

19. The seat assembly of claim 15, wherein the pivotable component includes first, second and third pivot holes formed therein.

20. A method of pivotally attaching a pivotable seat component to a fixed seat component, wherein the fixed component includes at least one aperture, at least one outer surface, and at least one inner surface adjacent the aperture, and the pivotable component includes at least one pivot hole therein, the method comprising:

affixing a nut to the fixed component;

fitting a generally cylindrical plastic bushing including swageable flanges over a bolt;

inserting the bolt and bushing through the aperture and the pivot hole to engage the bolt with the nut; and screwing the bolt into the nut to cause engagement of the swageable flanges against the inner surface to flare the flanges outwardly to a position perpendicular to a central axis of the bolt, thereby preventing metal-to-metal contact between the fixed component and the pivotable component, and between the bolt and pivoting component.

\* \* \* \* \*